United States Patent
Damsohn et al.

(10) Patent No.: US 8,129,047 B2
(45) Date of Patent: Mar. 6, 2012

(54) DEVICE FOR STORING ELECTRIC ENERGY

(75) Inventors: Herbert Damsohn, Aichwald (DE);
Conrad Pfender, Besigheim (DE);
Thomas Schiehlen, Altheim (DE);
Martin Steinbach, Waiblingen (DE);
Caroline Schmid, Stuttgart (DE)

(73) Assignee: Behr GmbH & Co., KG, Stuttgart (DE)

( * ) Notice: Subject to any disclaimer, the term of this patent is extended or adjusted under 35 U.S.C. 154(b) by 18 days.

(21) Appl. No.: 12/757,529

(22) Filed: Apr. 9, 2010

(65) Prior Publication Data

US 2010/0248000 A1   Sep. 30, 2010

Related U.S. Application Data

(63) Continuation of application No. PCT/EP2008/008344, filed on Oct. 2, 2008.

(30) Foreign Application Priority Data

Oct. 19, 2007   (DE) .......................... 10 2007 050 518

(51) Int. Cl.
*H01M 10/50* (2006.01)
*H01M 2/10* (2006.01)
(52) U.S. Cl. ............. 429/120; 429/97; 429/99; 429/159
(58) Field of Classification Search ........................ None
See application file for complete search history.

(56) References Cited

U.S. PATENT DOCUMENTS

2003/0186114 A1   10/2003   Lohr et al.

FOREIGN PATENT DOCUMENTS

| DE | 198 48 646 A1 | 4/2000 |
|----|---|---|
| DE | 199 30 399 A1 | 1/2001 |
| DE | 103 52 046 A1 | 6/2005 |
| DE | 102 14 367 B4 | 8/2006 |
| DE | 10 2007 009 315 A1 | 8/2007 |
| EP | 1 835 251 A1 | 9/2007 |
| WO | WO 03/103083 A2 | 12/2003 |
| WO | WO 2007/068223 A1 | 6/2007 |
| WO | WO 2007/137668 A1 | 12/2007 |

OTHER PUBLICATIONS

Machine translation of DE 10352046, Jun. 2005.*

* cited by examiner

*Primary Examiner* — Jonathan Crepeau
(74) *Attorney, Agent, or Firm* — Muncy, Geissler, Olds & Lowe, PLLC

(57) ABSTRACT

A device for storing electrical energy is provided, especially for a motor vehicle. The device includes at least one rechargeable storage cell and a cooling unit which is in thermal contact with the storage cell. The storage cell is accommodated in a retaining element and is in thermal contact with the retaining element, mating molded sections on the retaining element and the cooling unit mechanically interconnecting the retaining element and the cooling unit in a self-locking manner.

27 Claims, 5 Drawing Sheets

DEVICE FOR STORING ELECTRIC ENERGY

This nonprovisional application is a continuation of International Application No. PCT/EP2008/008344, which was filed on Oct. 2, 2008, and which claims priority to German Patent Application No. DE 10 2007 050 518.5, which was filed in Germany on Oct. 19, 2007, and which are both herein incorporated by reference.

BACKGROUND OF THE INVENTION

1. Field of the Invention

The invention relates to a device for storing electric energy.

2. Description of the Background Art

In particular for motor vehicles with at least partial electrical drive, increasing demands are being made on the capacity of a device for storing electric energy. The energy storage device can be conventional storage cells, modern lithium ion accumulators or also high performance capacitors or the like. These sources of electric energy have in common that they have to be cooled effectively due to their high power density, wherein, in addition to the technical requirements for a good thermal contact of the storage cells, a high operational reliability of the electrical insulation due to the high voltages occurring, in particular with serial interconnection of a plurality of storage cells, as well as a cost-effective series production moreover have to be taken into consideration.

DE 10 2007 009 315 A1, which is incorporated herein by reference, describes a device for cooling electric components of a motor vehicle, in which the cylindrical electric components are inserted into hollow cylindrical receptacles of a heat sink. For electrical insulation, further insulating layers, such as, for example, mica paper as well as adhesive for holding the electric components in the hollow cylindrical receptacles, are located between the electric component and the hollow cylindrical receptacle.

SUMMARY OF THE INVENTION

It is therefore an object of the invention to provide a device for storing electric energy in which a simple and reliable mounting is provided in connection with a good thermal contact between an electrical storage cell and a heat sink.

According to an embodiment of the invention, a secure and relatively tolerance-insensitive fixing of the holding element on the storage cell takes place. The holding element that is thermally conductive is then fixed with the storage cell accommodated therein on the heat sink via a self-locking mechanical connection. A self-locking mechanical connection, in addition to the advantage of easy assembly, is particularly well suited for producing a very good thermal contact between the holding element and the heat sink. Self-locking mechanical connections can have large rubbing surfaces acting against one another, whereby the thermal contact is promoted.

In an embodiment of the invention, the holding element can be bonded to the storage cell, in particular by adhesion. Alternatively, however, there can also be a purely mechanical, e.g., clamping hold of the storage cell in the holding element.

The holding element can be composed of at least two partial elements, which respectively partially surround the storage cell. In an embodiment, an adhesive or adhesive component for connecting adjacent partial elements can thereby be provided respectively on the partial elements. In all, a connection of the holding element and storage cell is rendered possible in a simple manner hereby, wherein the dimensional tolerances of the storage cell can be particularly large.

At least one of the corresponding formations can comprise a wedge surface, wherein the holding element can be fixed to the heat sink by the wedge surface, at least in a non-positive manner and in extensive thermal contact. Through the wedge surfaces, a mechanical self-locking hold can be produced in a simple manner, which hold due to its character furthermore renders possible a good heat transfer. Furthermore, a wedge surface can be provided both on the heat sink as well as on the holding element thereby, which wedge surfaces bear against one another. In an advantageous detail design, the storage cells are essentially shaped in a cylindrical manner, wherein the wedge surfaces are embodied as a conical section-shaped outside expansion of the holding element. In this manner the conical or cone section-shaped wedge surface of the holding element can be inserted into a correspondingly inverse hollow cone shaped wedge surface of the heat sink, wherein a secure self-locking mechanical connection with good thermal contact is produced with a suitable angle of the wedge surface or the cone.

In the interest of a simple and cost-effective production, the wedge surface can be a bead-like formation from a sheet metal blank.

In a further embodiment, the corresponding formations can comprise, at least in part, a screw thread. A screw thread of this type can be cylindrical or conical, for example, and essentially provide the contact surface between the holding element and the heat sink itself. However, it can also be embodied, for example, as a short end-side screw thread at the end of a conical wedge surface, so that large wedge surfaces acting against one another of the holding element and heat sink are pressed against one another with only a short screwing in of the short screw thread. With this type of embodiment, the angle of the wedge surfaces does not necessarily need to be self-locking, since the screw thread already achieves a self-locking mechanical connection.

In an embodiment, it is provided that the self-locking mechanical connection of holding element and heat sink can be secured by a further fixing, for example, by an adhesive force. This can be, for example, the application of a quantity of adhesive after the insertion of the holding element into the heat sink with mechanical self-locking, or it can also be filling a gap remaining between adjacent holding elements or storage cells and the heat sink, or similar measures. The aspect of securing the self-locking mechanical connection should be understood to mean that the self-locking mechanical connection in principle holds by itself, but can be additionally secured with respect to a long operating life with shocks, vibrations, and/or corrosive influences, for example atmospheric, atmospheric humidity condensate.

In a further embodiment, the holding element can be connected to the heat sink by another mechanical condition, for example, by a type of bayonet lock. Alternatively, friction welding or rolling are conceivable as connection mechanisms.

The holding element can be composed of a metal, in particular of aluminum, copper or aluminum with roller applied copper. In the interest of simple production, metals of this type can be easily shaped and furthermore have a good thermal conductivity. The heat sink is expediently composed of a metal of the same type, in particular of aluminum.

The holding element can be embodied as a sheet metal blank in an easy and cost-effective manner. Quite generally it can have a thickness between approximately 0.1 mm and approximately 2 mm, in order to provide a suitable holding and temperature dissipation for conventional cylindrical storage cells for use in motor vehicle batteries.

Depending on the design of the storage cells, in particular in the event that the storage cell has an electric potential on its outside wall, an electrically insulating layer can be provided between the holding element and the storage cell. This can be present in particular in the form of a hose, e.g., in the manner of a heat shrinkable sleeve shrunk on the storage cell.

In an embodiment, a region between the heat sink and a plurality of adjacent cells can be filled with a filler material. The thermal dissipation of heat produced in the storage cells can hereby be further improved, and furthermore a better mechanical protection of the entire device from shock, vibration or the like can be achieved. To reduce weight, the filler material can also be a foam.

In a further embodiment, the holding element can have at least one full perimeter clamping element in order to hold the holding element against the storage cell. The clamping element can be provided alternatively or additionally to a bond of the holding element to the storage cell by adhesive force. In general, the clamping element supports the thermal contact between the holding element and the storage cell when the holding element is inserted into the heat sink in a self-locking manner, whereby deformations due to mechanical stresses in the holding element can occur.

In a further embodiment, several storage cells are accommodated in the holding element. These can be several cylindrical storage cells arranged in series one behind the other in a hollow cylindrical holding element.

Furthermore, the formation of the holding element can be arranged above the storage cell, wherein a part of the holding element bearing against the storage cell extends on both sides of the formation. In this manner the mechanically self-locking part of the holding element thus thermally in contact with the heat sink is supplied particularly effectively with heat dissipated from the storage cell, so that overall a particularly high cooling capacity of a storage cell is achieved.

Alternatively or additionally, the holding element can penetrate the heat sink completely and in particular project out of the heat sink on both sides. Through an arrangement of this type of the holding element and storage cells on both sides with respect to a plane of the heat sink, the cooling capacity is used particularly effectively with given installation space. Likewise, it can be provided alternatively or also additionally that the heat sink has two sides lying opposite one another, wherein at least one holding element is fixed on each of the sides in a mechanically self-locking manner.

Alternatively, two or more heat sinks can also be mechanically connected to a holding element. An arrangement of this type is advantageous in particular for storage cells with high power densities, since cells of this type produce a considerable amount of waste heat.

The heat sink can be flowed through by a fluid for the exchange of heat for effective heat dissipation. This fluid can be a coolant, e.g., a mixture of water and glycol, for example, of a low-temperature refrigerant circuit or also a refrigerant of a refrigerant circuit, e.g., a vehicle air-conditioning system. The heat sink can be designed in particular as an evaporator of the refrigerant circuit.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
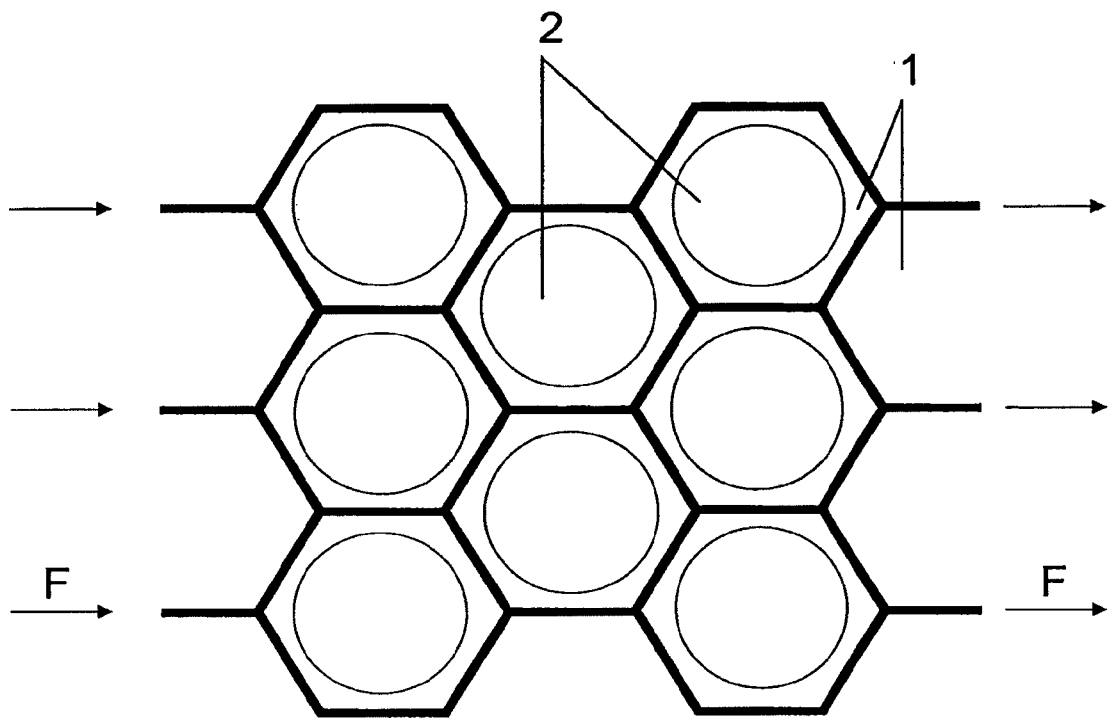
FIG. 1 shows a diagrammatic plan view of a device according to an embodiment of the invention.

The exemplary embodiment of a device for storing electric energy according to the invention shown diagrammatically in FIG. 1 shows diagrammatically an essentially plate-shaped heat sink 1, which extends in the drawing plane and on which a plurality of cylindrical electric storage cells 2 are fixed in a perpendicular manner. The electric storage cells 2 are lithium ion accumulators. The gaps between the storage cells 2 are filled with a plastic foam.

Apertures 1a (see FIG. 3) are arranged in the heat sink 1 in concentric overlapping with the storage cells 2 so that cooling channels 3 provided in the heat sink 1 run around the electric storage cells 2 in the plan view according to FIG. 1. The cooling channels 3 guide a liquid coolant (shown by an arrow F) of a low-temperature coolant circuit or also a refrigerant of a refrigerant circuit for dissipating heat from the storage cells.

Figure 2:
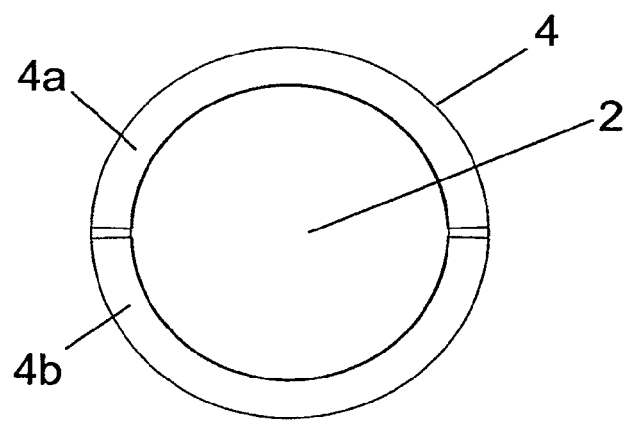
FIG. 2 shows a diagrammatic sectional view through a storage cell with holding element attached thereto, according to an embodiment of the invention.

According to the invention, the electric storage cells 2 are connected via holding elements 4 to the heat sink 1. FIG. 2 shows a diagrammatic sectional view through a storage cell 2 with holding element 4. The holding element 4 is respectively a plurality of sheet-metal blanks of aluminum bent in a partially cylindrical manner, wherein a first partial element 4a and a second partial element 4b are connected around the cylindrical storage cell 2 by adhesion thereto. This can also be three or more partial elements, which in all form the holding element 4, in which the cylindrical storage cell 2 is accommodated. A holding element 4 of only one partial element is also possible, for example, in the form of a cylindrical sleeve (not shown) slit along the longitudinal side.

In an embodiment that is not shown, an insulating layer embodied e.g., as a heat shrinkable sleeve can be provided between the storage cell 2 and the holding elements 4 preferably composed of aluminum or copper, in particular if the storage cell 2 does not have a potential-free outer sleeve. In general, with a device of this type at least some of the storage cells are connected in series with one another, so that an electric contact between a pole of the storage cell and the heat sink should be avoided.

Figure 3:
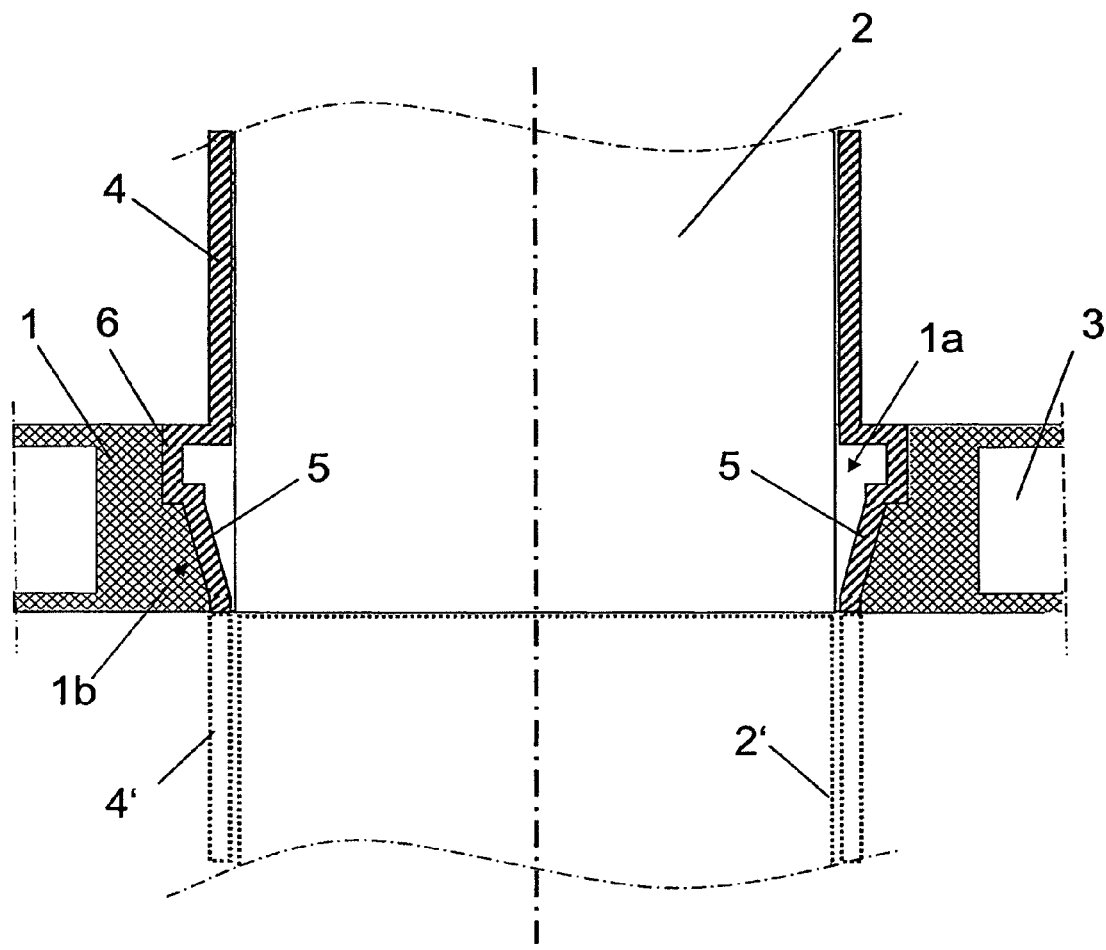
FIG. 3 shows a diagrammatic sectional view through the device from FIG. 1.

The holding element 4 or the partial elements 4a, 4b thereof are embodied as partial cylinders and have over a section of their height a wedge-shaped formation 5 for the mechanically self-locking fixing of the holding element 4 to the heat sink 1. As shown in FIG. 3, the aperture 1a of the heat sink 1 has a hollow wedge formation 1b corresponding to the conical section-shaped wedge surface 5, into which formation the conical section-shaped wedge surface 5 is inserted, wherein through frictional contact a mechanical self-locking and secure hold with at the same time good thermal contact between the holding element 4 and the heat sink 1 is produced.

In addition, the holding element 4 has a bead-like formation 6 adjoining the wedge surface 5, by means of which formation an improved guidance, an axial positioning and a uniform spacing of the cells during insertion into the heat sink 1 can be achieved. The partial elements 4a, 4b of the holding element 4 are in each case sheet metal blanks, wherein the wedge surface 5 can be produced in a simple manner in the manner of a bead, e.g., by shaping.

In the preferred exemplary embodiment, the groove angle of the wedge surface 5 is optimized with good thermal contact in the interest of good mechanical self-locking. An optimized angle of this type is between approximately 3° and approximately 10° and particularly preferably is approximately 7°.

A modification of the exemplary embodiment is shown by broken lines in FIG. 3, in which the cylindrical wall of the holding element 4, 4' continues on both sides of the wedge surface 5 and the heat sink 1, wherein moreover a further storage cell 2' is inserted in the continued region. It can also be provided that only one storage cell is located in the holding element, wherein however the wedge surface 5 is positioned in a central region of the storage cell overlapping with the storage cell. In particular, the region of the formation 5 in thermal contact with the heat sink 1 is hereby supplied with heat fed from the storage cells 2 from both sides, so that with given installation space a particularly effective heat dissipation is rendered possible.

Figure 4:
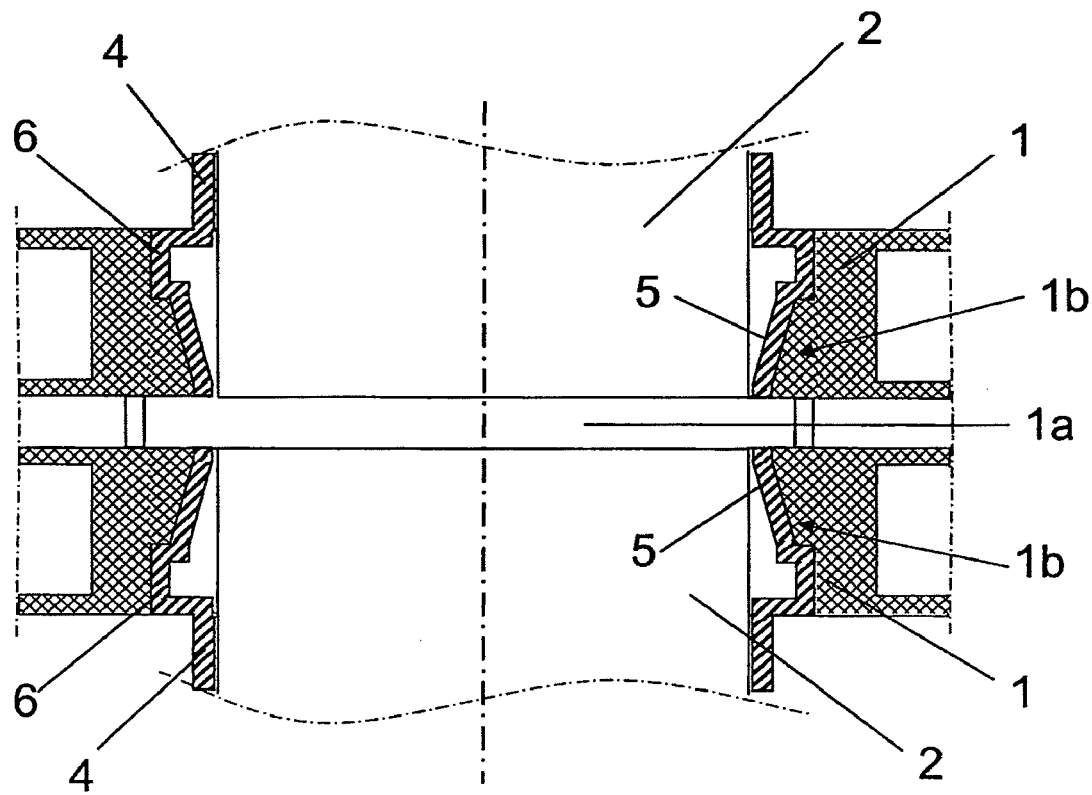
FIG. 4 shows a further exemplary embodiment of a device according to an embodiment of the invention.

In the modification of the exemplary embodiment according to FIG. 3 shown in FIG. 4, the heat sink likewise has apertures 1a, wherein, however, a tapering formation is provided in the same aperture 1a from each side. Accordingly, a holding element 4 can be inserted in a mechanically self-locking manner from each of the two sides, so that storage cells 2 extend on each of the opposite sides of the heat sink 1. A particularly good utilization of the cooling capacity of the heat sink 1 is also hereby achieved with given installation space.

Figure 5:
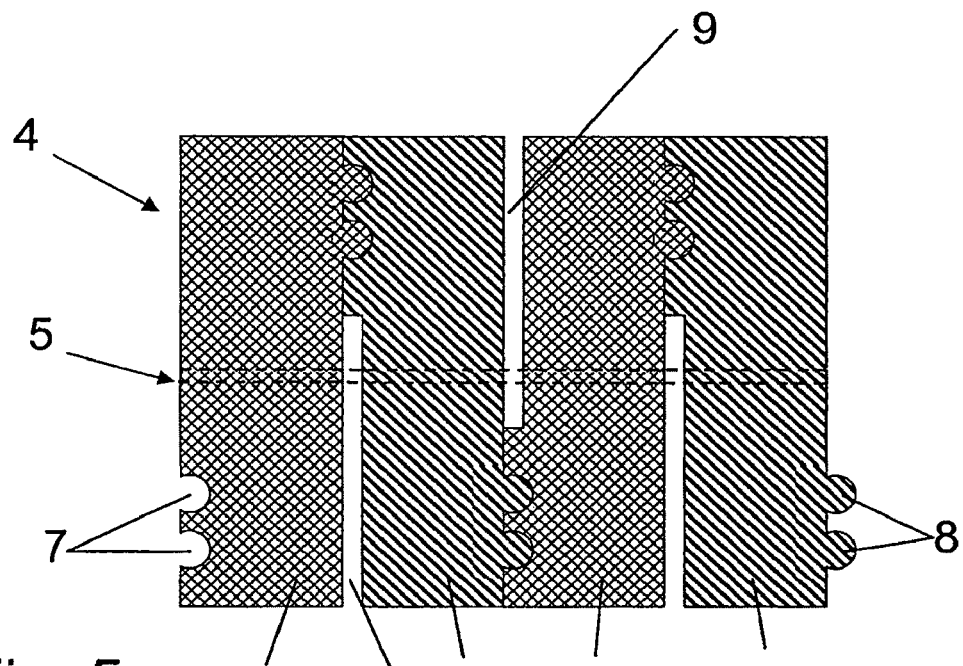
FIG. 5 shows a developed view of a holding element according to a further exemplary embodiment of the invention.

In the exemplary embodiment of the invention shown in FIG. 5, the holding element 4 is composed of four partial elements 4a, 4b, 4c, 4d. Similar to the modification shown by broken lines in FIG. 3, these partial elements have in their central region a central wedge surface 5 for the mechanically self-locking fixing in a heat sink 1.

The individual partial elements 4a-4d have respectively on the edge positive and negative form closure means 7, 8 in the form of partial circles, with which they are positively linked to one another in the manner of parts of a puzzle. The diameter of one of the partial circle-shaped, positive formations 7, 8 must thereby be smaller than four times the sheet thickness of the partial elements 4a-4d in order to achieve a secure positive linking.

A gap 9 respectively remains between the adjacent partial elements 4a-4d over approximately two thirds of the height of the holding element 4, in the area of which gap the adjacent holding elements 4a-4d do not abut against one another. Overall, through this positive linking of the holding elements 4a-4d a jacket is formed that is elastic in the circumferential direction and surrounds the storage cell 2, through which jacket a secure mechanical accommodation with good thermal contact of the storage cell 2 is rendered possible even with a large dimensional tolerance of the storage cell 2. Depending on requirements, the holding element 4 according to FIG. 5 can be fixed to the storage cell 2 only mechanically or also by means of adhesion.

Figure 6:
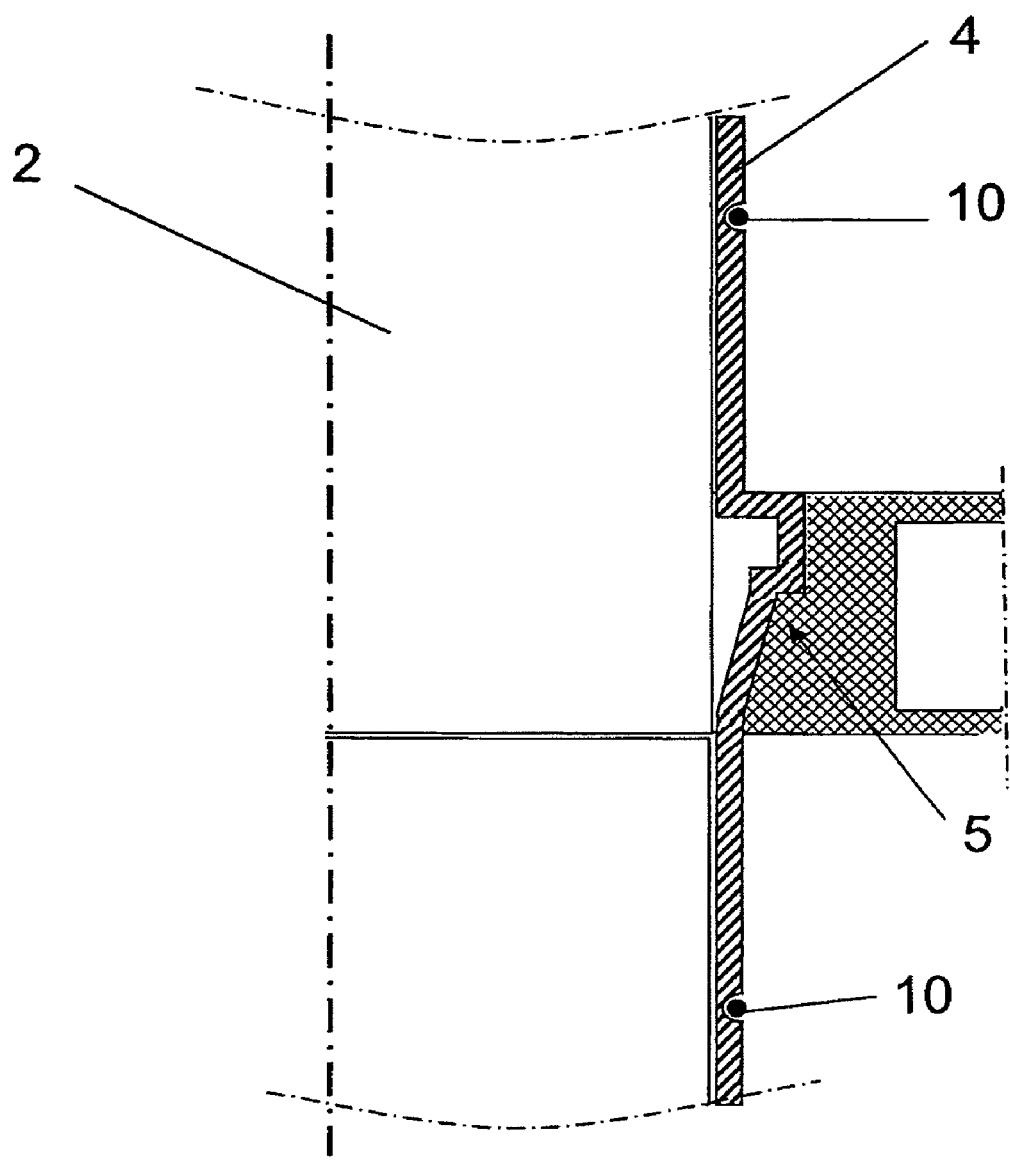
FIG. 6 shows a sectional view through a further exemplary embodiment of the invention.

In the exemplary embodiment shown in FIG. 6, the holding element 4 surrounds the storage cell 2 as in the exemplary embodiments previously described, wherein additionally several clamping rings 10 surrounding the holding elements are attached. A particularly secure hold and a particularly good thermal contact is hereby provided through the mechanical preload of the holding elements 4 against the wall of the storage cells 2. In particular, it is avoided hereby that the thermal contact is impaired due to a deformation or mechanical stress in the course of the insertion of the wedge surface 5 into the heat sink 1.

Figure 7:
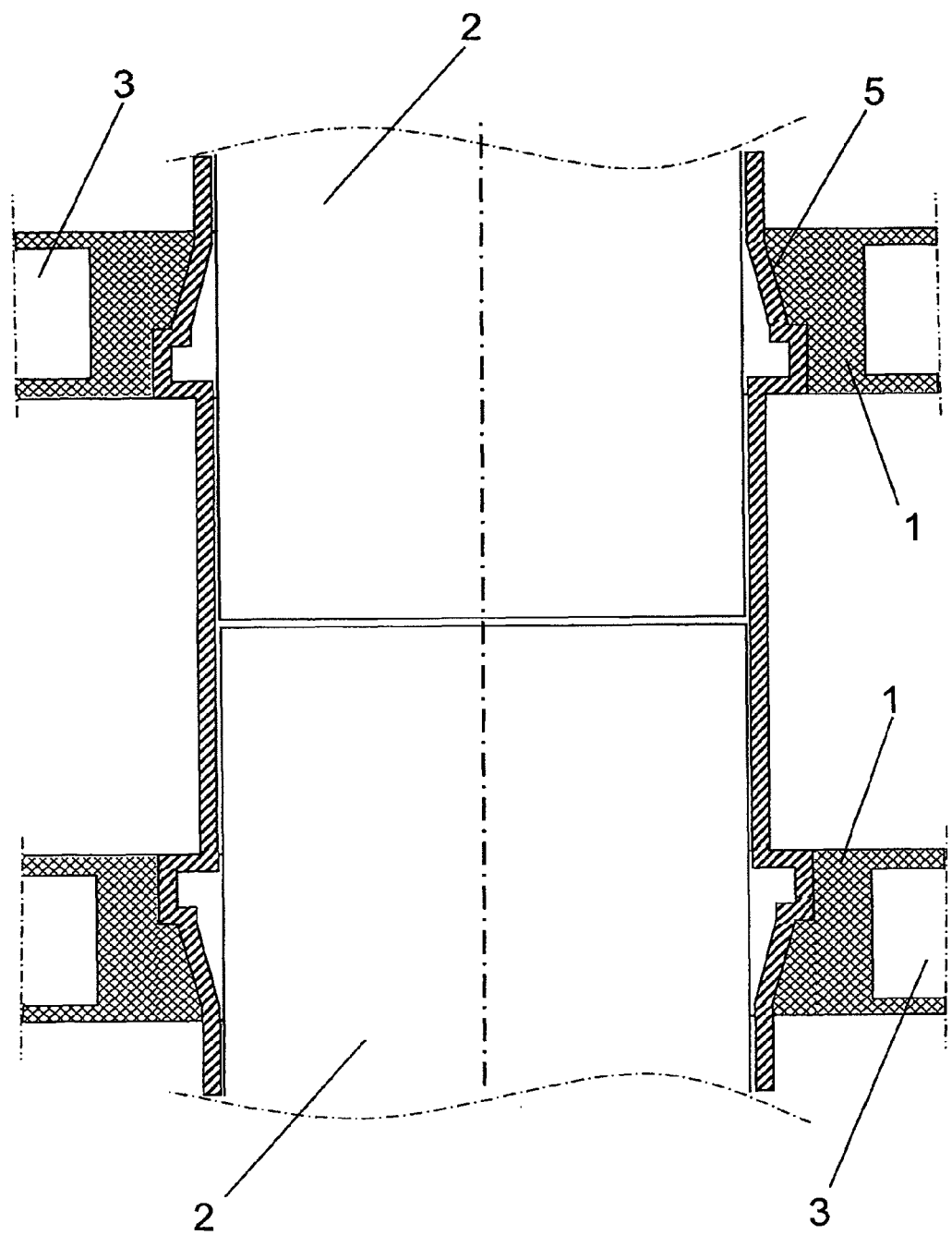
FIG. 7 shows a sectional view through a further exemplary embodiment of the invention.

In the exemplary embodiment shown in FIG. 7, two heat sinks 1 are mechanically connected in a self-locking manner to a holding element 4. Preferably, the heat sinks are arranged in the center of the storage cell seen in the axial direction of the storage cell 2 in order to avoid a large temperature gradient along the storage cell. Of course, the heat sinks alternatively can be attached to any other point on the holding element.

Of course, the individual features of the different exemplary embodiments described can be combined with one another in a useful manner depending on the requirements.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A device for storing electric energy for a motor vehicle, the device comprising:
    at least one rechargeable electric storage cell;
    a heat sink plate having a plurality of openings, each opening having a first portion having a first width and a second portion axially spaced from the first portion and having a second width less than the first width, the heat sink plate being in thermal contact with the storage cell;
    a holding element holding the at least one storage cell and being in thermal contact with the at least one storage cell, the holding element including a formation having a first portion complementary to the opening first portion and a second portion complementary to the opening second portion, the holding element being received in one of the plurality of through openings to form a self-locking mechanical connection of the holding element and the heat sink.

2. The device according to claim 1, wherein the holding element is bonded to the storage cell by adhesion.

3. The device according to claim 1, wherein the holding element comprises at least two partial elements, which respectively partially surround the storage cell.

4. The device according to claim 3, wherein a positive component is respectively provided on the partial elements for connecting adjacent partial elements.

5. The device according to claim 1, wherein at least one of the corresponding formations comprises a wedge surface, and wherein the holding element is fixed and in flat thermal contact to the heat sink by the wedge surface.

6. The device according to claim 5, wherein the wedge surface is provided on the heat sink and on the holding element.

7. A device for storing electric energy for a motor vehicle, the device comprising:
    at least one rechargeable electric storage cell;
    a heat sink that is configured to be in thermal contact with the storage cell;

a holding element configured to accommodate the storage cell, the storage cell being in thermal contact with the holding element; and corresponding formations provided on the holding element and on the heat sink configured for a self-locking mechanical connection of the holding element and the heat sink, wherein at least one of the corresponding formations comprises a wedge surface, and wherein the holding element is fixed and in flat thermal contact to the heat sink by the wedge surface, and wherein the storage cell is shaped essentially in a cylindrical manner and the wedge surface is configured as a conical section-shaped outside expansion of the holding element.

8. The device according to claim 5, wherein the wedge surface is configured as a bead-like formation from a sheet metal blank.

9. The device according to claim 1, wherein the corresponding formations, at least in part, comprise a screw thread.

10. The device according to claim 1, wherein the self-locking mechanical connection is secured by a further fixing or by an adhesive force.

11. The device according to claim 1, wherein the holding element is formed of a metal from the group of aluminum, copper or aluminum with roller-applied copper.

12. The device according to claim 1, wherein the holding element is a sheet metal blank.

13. The device according to claim 1, wherein the holding element has a thickness between approximately 0.1 mm and approximately 2 mm.

14. The device according to claim 1, wherein an electrically insulating layer in the form of a hose is arranged between the holding element and the storage cell.

15. The device according to claim 1, wherein a region between the heat sink and a plurality of adjacent cells is filled with a filler material.

16. The device according to claim 1, wherein the holding element has at least one full perimeter clamping element that is configured to hold the holding element against the storage cell.

17. The device according to claim 1, wherein a plurality of storage cells are accommodated in the holding element.

18. The device according to claim 1, wherein the formation of the holding element is spaced from the storage cell, and wherein a part of the holding element bearing against the storage cell extends on both sides of the formation.

19. A device for storing electric energy for a motor vehicle, the device comprising:

at least one rechargeable electric storage cell;

a heat sink that is configured to be in thermal contact with the storage cell;

a holding element configured to accommodate the storage cell, the storage cell being in thermal contact with the holding element; and corresponding formations provided on the holding element and on the heat sink configured for a self-locking mechanical connection of the holding element and the heat sink, wherein the holding element penetrates the heat sink completely and projects out of the heat sink on both sides.

20. The device according to claim 1, wherein the heat sink has two opposite sides, wherein on each of the sides at least one holding element is mechanically fixed in a self-locking manner.

21. The device according to claim 1, wherein the heat sink is configured to be flowed through by a fluid for the exchange of heat.

22. The device according to claim 21, wherein the fluid is a coolant of a low-temperature cooling circuit.

23. The device according to claim 22, wherein the coolant is a water/glycol mixture.

24. The device according to claim 21, wherein the fluid is a refrigerant of a refrigerant circuit of a vehicle air-conditioning system.

25. A device for storing electric energy for a motor vehicle, the device comprising:

a rechargeable electric storage cell;

a heat sink plate having at least one through opening having an axis and having a tapered portion tapering in an axial direction;

a holding element holding the storage cell and being in thermal contact with the storage cell, the holding element including a radially projecting formation substantially encircling the holding element and having a tapered wall;

wherein the holding element and the storage cell held by the holding element are mounted in the at least one through opening with the tapered wall of the radially projecting formation in contact with the tapered portion of the through opening, the storage cell being thermally connected to the heat sink plate through the holding element.

26. The device according to claim 25, wherein, the heat sink plate includes a first surface, the through opening includes a cylindrical portion between the first surface and the tapered portion, and the formation includes a bead complementary to and received within the cylindrical portion of the through opening.

27. The device according to claim 25, wherein the holding element penetrates the heat sink plate completely and projects out of opposite sides of the heat sink plate.

* * * * *